United States Patent
Lee

(10) Patent No.: US 9,450,809 B2
(45) Date of Patent: Sep. 20, 2016

(54) METHOD OF HANDLING UPLINK TRANSMISSION AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 84 days.

(21) Appl. No.: 14/514,369

(22) Filed: Oct. 14, 2014

(65) Prior Publication Data

US 2015/0117181 A1    Apr. 30, 2015

Related U.S. Application Data

(60) Provisional application No. 61/896,626, filed on Oct. 28, 2013.

(51) Int. Cl.
| | | |
|---|---|---|
| G01R 31/08 | (2006.01) | |
| H04L 12/24 | (2006.01) | |
| H04L 5/00 | (2006.01) | |
| H04W 76/06 | (2009.01) | |
| H04L 1/00 | (2006.01) | |
| H04W 16/32 | (2009.01) | |
| H04W 88/06 | (2009.01) | |
| H04W 76/02 | (2009.01) | |

(52) U.S. Cl.
CPC ........ *H04L 41/0654* (2013.01); *H04W 76/064* (2013.01); *H04L 5/0078* (2013.01); *H04L 5/0096* (2013.01); *H04L 2001/0093* (2013.01); *H04W 16/32* (2013.01); *H04W 76/026* (2013.01); *H04W 76/068* (2013.01); *H04W 88/06* (2013.01)

(58) Field of Classification Search
CPC ............ H04L 41/0654; H04L 5/0078; H04L 2001/0093; H04L 5/0096; H04W 76/064; H04W 76/068; H04W 16/32; H04W 88/06; H04W 76/026
See application file for complete search history.

(56) References Cited

U.S. PATENT DOCUMENTS

| | | | |
|---|---|---|---|
| 8,548,513 B2 * | 10/2013 | Yoon ..................... | H04L 5/0007 370/230 |
| 8,711,709 B2 * | 4/2014 | Marinier ............... | H04W 72/02 370/242 |
| 2005/0271012 A1 | 12/2005 | Agrawal | |
| 2006/0183429 A1 * | 8/2006 | Anderson ................. | H04L 1/20 455/67.13 |

(Continued)

FOREIGN PATENT DOCUMENTS

| | | | | |
|---|---|---|---|---|
| EP | 2 205021 | * 12/2008 | ............ | H04W 36/02 |
| JP | 2013162327 A | 8/2013 | | |

(Continued)

OTHER PUBLICATIONS

WCDMA3G.RU, (electronic resource) http://wcdma3g.ru/index.php?topic=glava9&page=3, Mar. 2010.

*Primary Examiner* — Robert Wilson
(74) *Attorney, Agent, or Firm* — Winston Hsu; Scott Margo

(57) ABSTRACT

A method of handling at least one uplink (UL) transmission for a communication device communicating with a first base station and a second base station comprises detecting a radio link problem between the communication device and the second base station; and stopping performing at least one UL transmission for the second base station, after the radio link problem is detected.

18 Claims, 4 Drawing Sheets

(56) References Cited

U.S. PATENT DOCUMENTS

| | | | | |
|---|---|---|---|---|
| 2010/0080116 A1* | 4/2010 | Agashe | H04W 36/08 | 370/216 |
| 2010/0239036 A1* | 9/2010 | Koo | H04B 7/024 | 375/260 |
| 2010/0330993 A1* | 12/2010 | Kone | H04W 36/0055 | 455/436 |
| 2011/0070880 A1 | 3/2011 | Song | | |
| 2012/0115485 A1* | 5/2012 | Narasimha | H04W 68/02 | 455/437 |
| 2012/0208527 A1* | 8/2012 | Park | H04W 76/068 | 455/423 |
| 2013/0337812 A1* | 12/2013 | Pekonen | H04W 76/062 | 455/436 |
| 2014/0126530 A1* | 5/2014 | Siomina | H04W 52/146 | 370/330 |
| 2014/0295860 A1* | 10/2014 | Kuo | H04W 24/02 | 455/450 |

FOREIGN PATENT DOCUMENTS

| | | |
|---|---|---|
| KR | 1020120002546 A | 1/2012 |
| KR | 1020130045169 A | 5/2013 |
| RU | 2 341 022 C2 | 12/2008 |
| WO | WO 2010121885 A1 | 10/2010 |
| WO | 2011100673 A1 | 8/2011 |
| WO | 2012149898 A1 | 11/2012 |
| WO | 2013022751 A1 | 2/2013 |
| WO | 2013139305 A1 | 9/2013 |
| WO | 2013151394 A1 | 10/2013 |
| WO | 2014114261 A1 | 7/2014 |

* cited by examiner

METHOD OF HANDLING UPLINK TRANSMISSION AND RELATED COMMUNICATION DEVICE

CROSS REFERENCE TO RELATED APPLICATIONS

This application claims the benefit of U.S. Provisional Application No. 61/896,626, filed on Oct. 28, 2013 and incorporated herein by reference.

BACKGROUND OF THE INVENTION

1. Field of the Invention

The present invention relates to a method used in a wireless communication system and related communication device, and more particularly, to a method of handling an uplink transmission and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

In one example, there may be three eNBs NB1-NB3, wherein the eNB NB1 may be a macrocell eNB with a larger coverage area, and the eNBs NB2-NB3 in the coverage area of the eNB NB1 may be microcell eNBs (or other small-cell eNBs) with smaller coverage areas. A UE may be in both the coverage areas of the eNBs NB1-NB2, e.g., communicate with the eNBs NB1-NB2 simultaneously, when the UE is configured with the dual connectivity. The UE may move from the coverage area of the eNB NB2 to the eNB NB3 due to movements of the UE, while the UE is still in the coverage area of the eNB NB1. In this situation, the UE does not know how to perform a UL transmission (e.g., control information, reference signal and/or data), because the UE is now in the coverage areas of the eNB NB1 and NB3. For example, the UE does not know whether it should transmit a sounding reference signal (SRS) for the eNB NB2. In another example, the UE may move out the coverage area of the eNB NB2 due to movements of the UE, while the UE is still in the coverage area of the eNB NB1. In this situation, the UE does not know how to perform a UL transmission (e.g., control information, reference signal and/or data), because the UE is only in the coverage area of the eNB NB1 now. For example, the UE does not know whether it should transmit a SRS for the eNB NB2. In the above examples, the UE may transmit data with a different allocation according to whether and how the SRS is transmitted. That is, the transmission of the data is affected by the transmission of the SRS which is unknown.

Thus, how to perform the UL transmission when a coverage area where the UE locates is changed is an important problem to be solved.

SUMMARY OF THE INVENTION

The present invention therefore provides a method and related communication device for handling a UL transmission to solve the abovementioned problem.

A method of handling at least one uplink (UL) transmission for a communication device communicating with a first base station and a second base station comprises detecting a radio link problem between the communication device and the second base station, and stopping performing at least one UL transmission for the second base station, after the radio link problem is detected.

A communication device for communicating with a first base station and a second base station comprises a storage unit for storing instructions of detecting a radio link problem between the communication device and the second base station, and stopping performing at least one uplink (UL) transmission for the second base station, after the radio link problem is detected; and a processing means, coupled to the storage unit, configured to execute the instructions stored in the storage unit.

A computer program product for communicating with a first base station and a second base station comprises a computer-readable medium comprising a first set of codes for causing the computer program product to detect a radio link problem between the computer program product and the second base station, and a second set of codes for causing the computer program product to stop performing at least one uplink (UL) transmission for the second base station, after the radio link problem is detected.

An apparatus for communicating with a first base station and a second base station comprises means for causing the apparatus to detect a radio link problem between the apparatus and the second base station, and means for causing the apparatus to stop performing at least one uplink (UL) transmission for the second base station, after the radio link problem is detected.

An apparatus for communicating with a first base station and a second base station comprises at least one processor configured to detect a radio link problem between the apparatus and the second base station, and a receiver configured to stop performing at least one uplink (UL) transmission for the second base station, after the radio link problem is detected.

At least one processor configured to communicate with a first base station and a second base station comprises a first module for causing the at least one processor to detect a radio link problem between the at least one processor and the second base station, and a second module for causing the at least one processor to stop performing at least one uplink (UL) transmission for the second base station, after the radio link problem is detected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
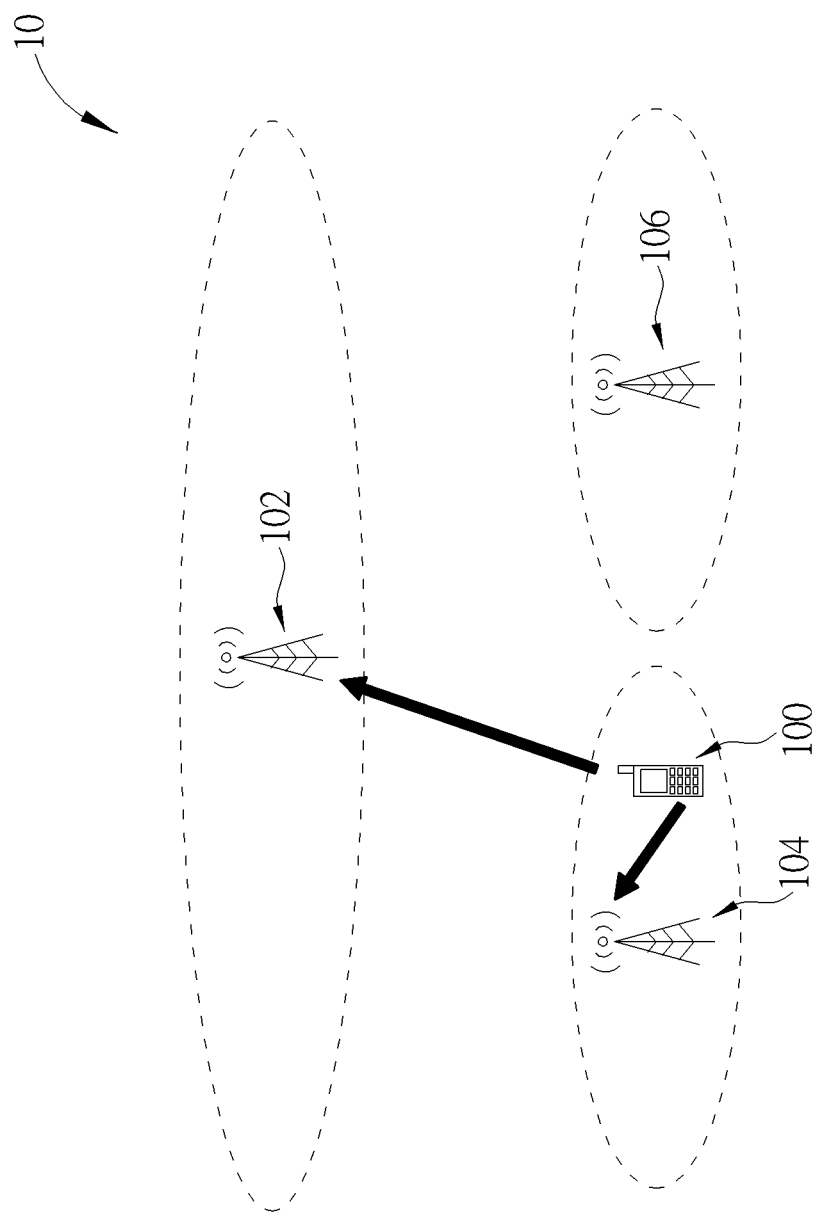
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100 and base stations (BSs) 102, 104 and 106. In FIG. 1, the UE 100, the BSs 102, 104 and 106 and are simply utilized for illustrating the structure of the wireless communication system 10. Practically, the BS 102 (or the BS 104 or the BS 106) may be an evolved NB (eNB) or a relay station in an evolved UTRAN (E-UTRAN), a long term evolution (LTE) system, a LTE-Advanced (LTE-A) system or an evolution of the LTE-A system. The wireless communication system 10 may be a time-division duplexing (TDD) system (i.e., the TDD is operated) or a frequency-division duplexing (FDD) system (i.e., the FDD is operated). As an example, the BS 102 may be a macrocell BS with a larger coverage area, and the BS 104 and 106 in the coverage area of the BS 102 may be microcell BSs (or other small-cell BSs) with smaller coverage areas. In another example, the BS 102 may be a master eNB (MeNB), and the BSs 104 and 106 may be secondary eNBs (SeNBs). The UE 100 may be configured one or more cells which form a master cell group (MCG) managed by the MeNB. The UE 100 may be configured one or more cells which form a secondary cell group (SCG) managed by a SeNB.

As shown in FIG. 1, the UE 100 may communicate with the BS 102 and the BS 104 at the same time according to dual connectivity configured to the UE 100. That is, the UE 100 may perform a transmission/reception via both the BSs 102 and 104. For example, the UE 100 may receive packets (e.g., transport blocks (TBs)), signals (e.g., control information, reference signalings) and/or messages from the BSs 102 and 104 according to the dual connectivity, or the UE 100 may transmit packets (e.g., TBs), signals (e.g., control information, reference signals) and/or messages to the BSs 102 and 104 according to the dual connectivity. The UE 100 may move from the coverage area of the BS 104 to the coverage area of the BS 106 due to movements of the UE 100, while the UE 100 is still in the coverage area of the BS 102. In this situation, the UE 100 may detect a radio link problem, because link quality between the UE 100 and the BS 104 may be lower than a threshold.

The UE 100 may be a machine type communication (MTC) device, a mobile phone, a laptop, a tablet computer, an electronic book or a portable computer system. In addition, the UE 100, the BS 102, the BS 104 or the BS 106 may be seen as a transmitter or a receiver according to its transmission direction. For example, for an uplink (UL), the UE 100 is the transmitter and the BSs 102-106 are the receivers, and for a downlink (DL), the BSs 102-106 are the transmitters and the UE 100 is the receiver.

Figure 2:
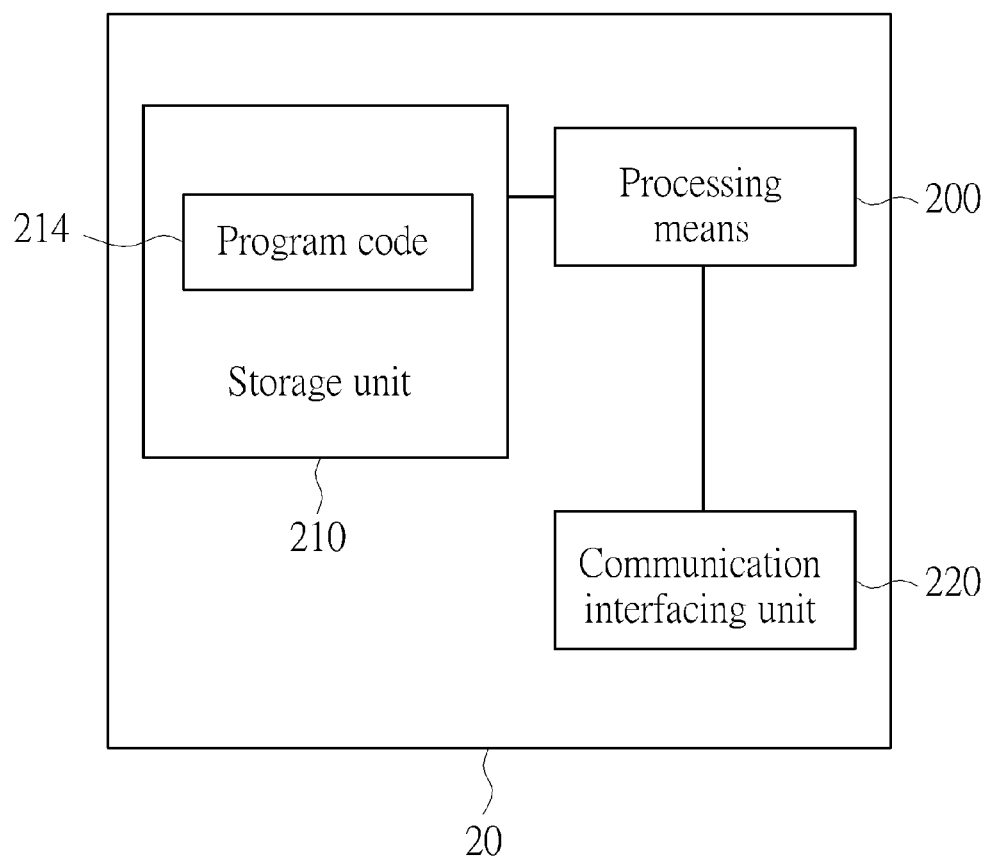
FIG. 2 is a schematic diagram of a communication device according to an example of the present invention.

FIG. 2 is a schematic diagram of a communication device 20 according to an example of the present invention. The communication device 20 may be the UE 100, the BS 102, the BS 104 and/or the BS 106 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM)/digital versatile disc-ROM (DVD-ROM)/Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
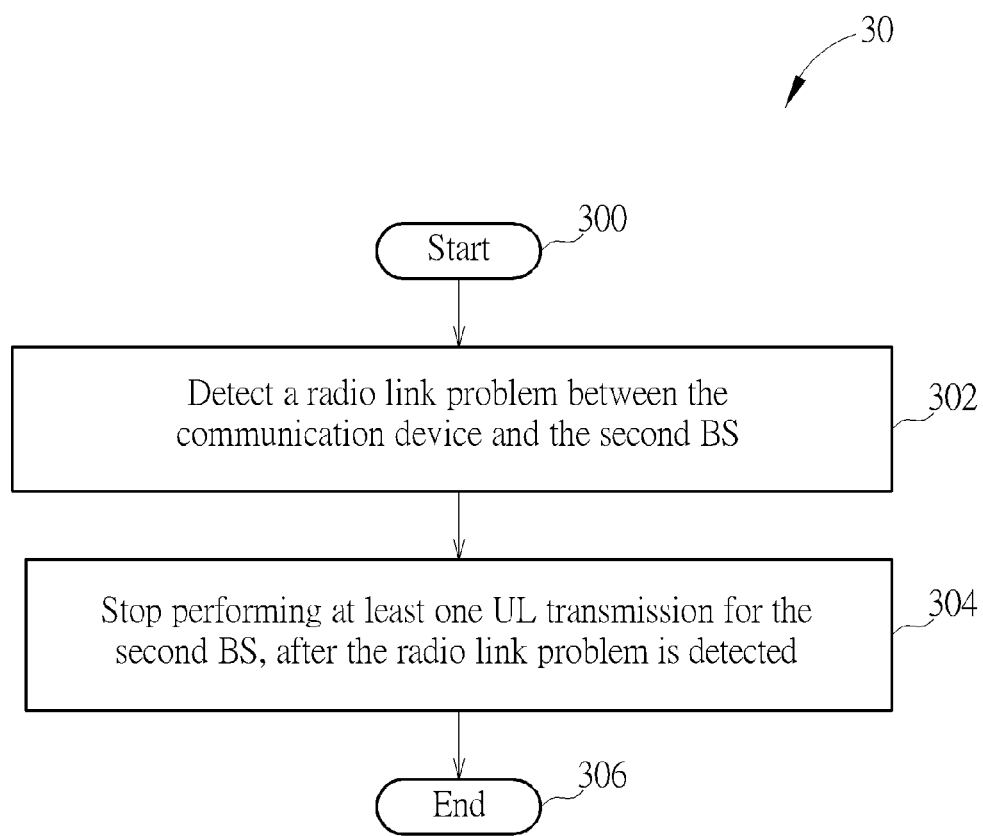
FIG. 3 is a flowchart of a process according to an example of the present invention.

FIG. 3 is a flowchart of a process 30 according to an example of the present invention. The process 30 may be utilized in a communication device (e.g., the UE 100), for performing at least one UL transmission, when the communication device is communicating with a first BS (e.g., the BS 102) and a second BS (e.g., the BS 104). The process 30 may be compiled into the program code 214 and includes the following steps:

Step 300: Start.

Step 302: Detect a radio link problem between the communication device and the second BS.

Step 304: Stop performing at least one UL transmission for the second BS, after the radio link problem is detected.

Step 306: End.

According to the process 30, the communication device may detect a radio link problem between the communication device and the second BS. Then, the communication device may stop (e.g., suspend) performing at least one UL transmission for the second BS, after the radio link problem is detected. That is, the UE 100 may stop the at least one UL transmission, after detecting the radio link problem (e.g., radio link failure (RLF)). For example, the at least one UL transmission may be all UL transmissions for the BS 104. The RLF may include a SeNB RLF (S-RLF) and/or a SCG-RLF. In addition, there are various ways for the UE 100 to detect the RLF. For example, the UE 100 may determine that the RLF occurs, if a counter (e.g., T310) expires. According to the above description, the UE 100 will not cause an interference to another BS (e.g., the BS 106) by transmitting improper signal(s) (e.g., data, control information and/or reference signal), if the UE 100 moves from the coverage area of the BS 104 to the coverage area of the BS 106 or is out of the coverage area of the BS 104. For example, the BS 106 may not expect to receive a signal transmitted by the UE 100. Signals transmitted by other UEs may be affected by the UE 100 and the BS 106 may not detect the signals accurately, if the UE 100 transmits the signal to the BS 106 (i.e., in the coverage area of the BS 106).

In addition, according to the process 30, the UE 100 will not transmit signal(s) (e.g., data, control information and/or reference signal) with improper allocation(s) to the BS 102, such that the BS 102 is unable to detect (e.g., decode and/or demodulate) the signal(s) correctly. For example, how a signal is transmitted in a subframe may be determined according to whether a sounding reference signal (SRS) is scheduled in the subframe. In detail, the last orthogonal frequency division multiplexing (OFDM) symbol of the subframe cannot be used for transmitting the data (e.g., via a physical UL shared channel (PUSCH)), if the SRS is scheduled in the subframe. For example, the BS 102 cannot detect the data in the subframe correctly, if the BS 102 expects to receive the SRS in the last OFDM symbol of the subframe while the UE 100 transmits the data in the last OFDM symbol. In another example, the BS 102 cannot detect the data in the subframe correctly either, if the BS 102 does not expect the SRS in the last OFDM symbol of the subframe while the UE 100 transmits the SRS in the last OFDM symbol.

Furthermore, signal(s) (e.g., data via a PUSCH) transmitted by the UE 100 will not be lost. The signal(s) transmitted by the UE 100 may not be received by the BSs 102 and 106, if the UE 100 transmits the signal(s) and the BSs 102 and 106 does not expect to receive the signal(s). The problem is solved according to the process 30. It should be noted that the above situations usually happen when a backhaul between the BSs 102 and 106 is nonideal. That is, the BSs 102 and 106 may not be able to exchange related information immediately via the backhaul, e.g., due to a delay.

Realization of the present invention is not limited to the above description.

The UE 100 may further transmit information related to the radio link problem to the BS 102. That is, the UE 100 notifies the BS 102 that there is the radio link problem between the UE 100 and the BS 104. For example, the information may include an indicator indicating that a release of at least one configuration of the at least one UL transmission, wherein the at least one configuration may correspond to the at least one UL transmission, respectively. Note that the UE 100 may simply notifying the release of the at least one configuration to the BS 102 without releasing the at least one configuration. In another example, the information may include an indicator indicating that the radio link problem is detected (e.g., to indicate the RLF occurred due to an expiration of a counter T310). That is, the UE 100 may notify the BS 102 the radio link problem, e.g., without releasing any configuration.

Furthermore, the UE 100 may release at least one configuration of at least one UL transmission for the BS 104, e.g., after transmitting information related to the radio link problem to the BS 102. In one example, the UE 100 may release at least one configuration of the at least one UL transmission, after receiving an acknowledgement transmitted by the BS 102 for responding to the information. That is, the UE 100 may not release the at least one configuration arbitrarily, but may release the at least one configuration according to the acknowledgement. In another example, the UE 100 may release at least one configuration of the UL transmission according to a higher layer signaling (e.g., radio resource control (RRC) signaling) transmitted by the BS 102. For example, the BS 102 may transmit the higher layer signaling to indicate to the UE 100 to release the at least one configuration, e.g., before (or after) receiving the information related to the radio link problem transmitted by the UE 100. The higher layer signaling may include information indicating the UE 100 to release the at least one configuration (e.g., physical UL control channel (PUCCH) configuration and/or SRS configuration). In another example, the UE 100 may release at least one configuration of the UL transmission, after the information is transmitted for a time interval. That is, the UE 100 may not expect an acknowledgement from the BS 102, but may start a timer for releasing the at least one configuration. The UE 100 may simply release the at least one configuration after the timer expires, e.g., 2 seconds. In short, the UE 100 may release at least one configuration of at least one UL transmission according to a proper criterion, and is not limited to the above examples.

It should be noted that the at least one UL transmission mentioned above is not limited to the above description. For example, the at least one UL transmission may include a PUCCH transmission. In another example, the at least one UL transmission may include a SRS transmission. In another example, the at least one UL transmission may include both the PUCCH and the SRS transmission. That is, at least one configuration of the UL transmission mentioned above may include a configuration of the PUCCH (i.e., PUCCH configuration), a configuration of the SRS transmission (i.e., SRS configuration), or both the configurations of the PUCCH and the SRS transmission (i.e., SRS/PUCCH configuration). In another example, the UE 100 may release a configuration of a PUCCH transmission for the BS 104, while keep a configuration of a SRS transmission for the BS 104. That is, the UE 100 treats the configurations of the PUCCH transmission and the SRS transmission differently. The UE 100 does not know how to perform transmission(s) (e.g., SRS transmission and PUCCH transmission), i.e., does not perform the transmission(s), if a corresponding configuration (e.g., SRS/PUCCH configuration) is released. In general, the SRS/PUCCH configuration is configured at the same time.

In addition to release of at least one configuration of at least one UL transmission, the UE 100 may release a configuration of the BS 104 instead. In one example, the UE 100 may release a configuration of the BS 104, after transmitting the information related to the radio link problem to the BS 102. In one example, the UE 100 may release a configuration of the BS 104, after receiving an acknowledgement transmitted by the BS 102 for responding the information. That is, the UE 100 may not release the configuration arbitrarily, but may release the configuration according to the acknowledgement. In another example, the UE 100 may release a configuration of the BS 104 according to a higher layer signaling (e.g., RRC signaling) transmitted by the BS 102. For example, the BS 102 may transmit the higher layer signaling to indicate to the UE 100 to release the configuration, e.g., before (or after) receiving the information related to the radio link problem transmitted by the UE 100. The higher layer signaling may include information to indicate the UE 100 to release the configuration. In another example, the UE 100 may release a configuration of the BS 104, after the information is transmitted for a time interval. That is, the UE 100 may not expect an acknowledgement from the BS 102, but may start a timer for releasing the configuration. The UE 100 may simply release the configuration after the timer expires, e.g., 2 seconds. In short, the UE 100 may release a configuration of the BS 104 according to a proper criterion, and is not limited to the above examples.

Figure 4:
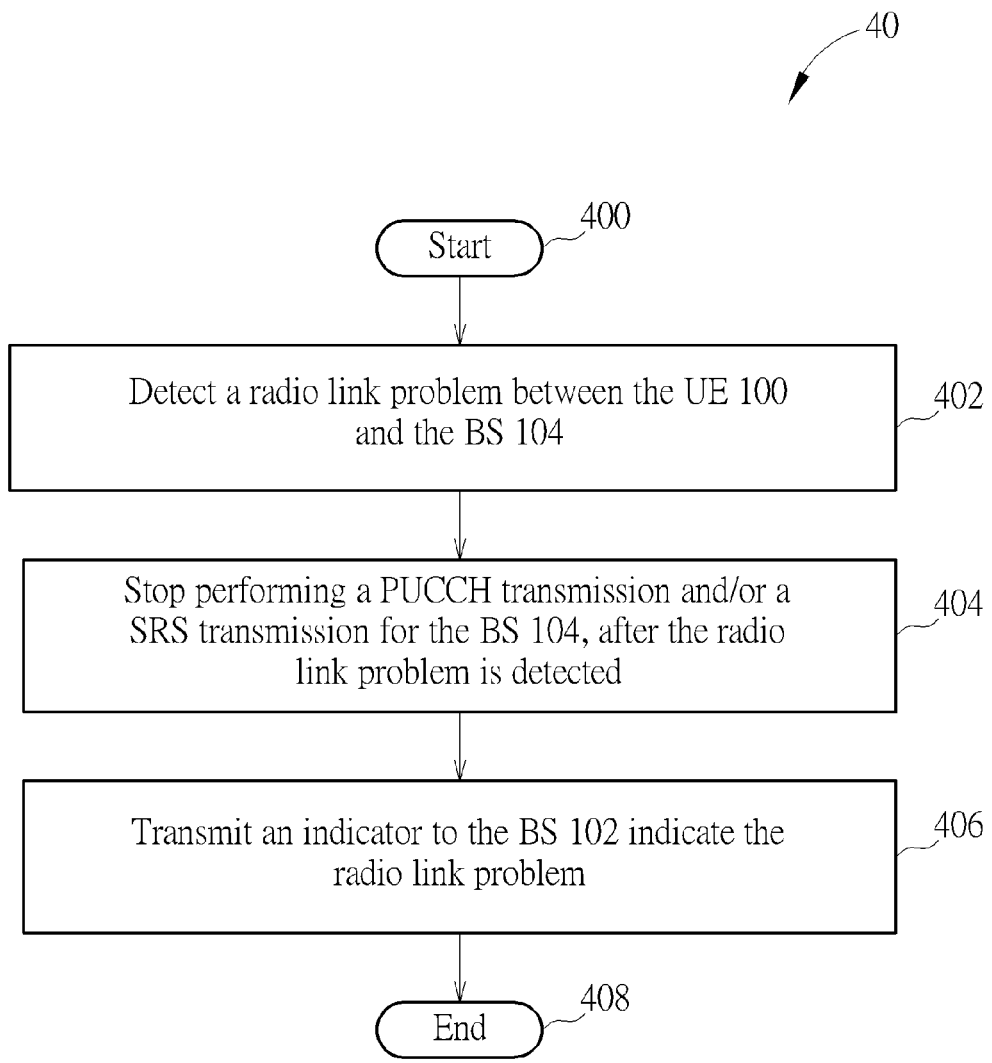
FIG. 4 is a flowchart of a process according to an example of the present invention.

FIG. 4 is a flowchart of a process 40 according to an example of the present invention. The process 40 may be utilized in the UE 100, for performing at least one UL transmission, when the UE 100 is communicating with the BS 102 and the BS 104. The process 40 may be compiled into the program code 214 and includes the following steps:

Step 400: Start.

Step 402: Detect a radio link problem between the UE 100 and the BS 104.

Step 404: Stop performing a PUCCH transmission and/or a SRS transmission for the BS 104, after the radio link problem is detected.

Step 406: Transmit an indicator to the BS 102 indicate the radio link problem.

Step 408: End.

According to the process 40, the UE 100 detects a radio link problem between the UE 100 and the BS 104. The UE 100 may stop performing a PUCCH transmission and/or a SRS transmission for the BS 104, after the radio link problem is detected. The UE 100 may transmit an indicator to the BS 102 indicate the radio link problem. Then, the UE 100 may release configurations of the PUCCH transmission and/or the SRS transmission according to a higher layer signaling (e.g., RRC signaling) (e.g., transmitted by the BS 102). Details and variations of the process 40 can be referred to the previous description, and is not narrated herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method of handling UL transmission(s). The present invention solves that a communication device in the art does not know how to perform the UL transmission(s) when a radio link problem is detected. The radio link problem may occur, when the communication device moves from a coverage area of a BS to a coverage area of another BS. Thus, the BSs and the communication device can operate regularly without being affected by the radio link problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling at least one uplink (UL) transmission for a communication device communicating with a first base station and a second base station, the method comprising:
   detecting, by the communication device, a radio link problem between the communication device and the second base station;
   stopping performing, by the communication device, at least one UL transmission for the second base station, after the radio link problem is detected; and
   transmitting information related to the radio link problem to the first base station, wherein the information comprises an indicator indicating that the radio link problem is detected.

2. The method of claim 1, wherein the information comprises an indicator indicating that a release of at least one configuration of the at least one UL transmission.

3. The method of claim 1, further comprising:
   releasing at least one configuration of the at least one UL transmission, after receiving an acknowledgement transmitted by the first base station for responding to the information.

4. The method of claim 1, further comprising:
   releasing at least one configuration of the at least one UL transmission, after the information is transmitted for a time interval.

5. The method of claim 1, further comprising:
   releasing a configuration of the second base station, after receiving an acknowledgement transmitted by the first base station for responding to the information.

6. The method of claim 1, further comprising:
   releasing a configuration of the second base station, after the information is transmitted for a time interval.

7. The method of claim 1, further comprising:
   releasing, by the communication device, at least one configuration of the at least one UL transmission according to a higher layer signaling transmitted by the first base station.

8. The method of claim 1, further comprising:
   releasing, by the communication device, a configuration of the second base station according to a higher layer signaling transmitted by the first base station.

9. The method of claim 1, wherein the at least one UL transmission comprises a physical UL control channel (PUCCH) transmission and/or a sounding reference signal (SRS) transmission.

10. The method of claim 9, further comprising:
    releasing, by the communication device, a configuration of the PUCCH transmission for the second base station; and
    keeping, by the communication device, a configuration of the SRS transmission for the second base station.

11. A communication device for communicating with a first base station and a second base station, the communication device comprising:
    a storage unit for storing instructions; and a processor coupled to the storage unit, wherein the processor upon executing the instructions performs the following:

detecting a radio link problem between the communication device and the second base station;

stopping performing at least one uplink (UL) transmission for the second base station, after the radio link problem is detected; and transmitting information related to the radio link problem to the first base station, wherein the information comprises an indicator indicating that the radio link problem is detected.

12. The communication device of claim 11, wherein the processor upon executing the instructions further performs the following:

releasing at least one configuration of the at least one UL transmission according to a higher layer signaling transmitted by the first base station.

13. The communication device of claim 11, wherein the processor upon executing the instructions further performs the following:

releasing a configuration of the second base station according to a higher layer signaling transmitted by the first base station.

14. The communication device of claim 11, wherein the at least one UL transmission comprises a physical UL control channel (PUCCH) and/or a sounding reference signal (SRS) transmission.

15. A computer program product for communicating with a first base station and a second base station, the computer program product comprising a non-transitory computer-readable medium storing instructions which when being executed by a processor perform the following:

detecting a radio link problem between the computer program product and the second base station;

stopping performing at least one uplink (UL) transmission for the second base station, after the radio link problem is detected; and transmitting information related to the radio link problem to the first base station, wherein the information comprises an indicator indicating that the radio link problem is detected.

16. An apparatus for communicating with a first base station and a second base station, the apparatus comprising:

means for detecting a radio link problem between the apparatus and the second base station;

means for stopping performing at least one uplink (UL) transmission for the second base station, after the radio link problem is detected; and means for transmitting information related to the radio link problem to the first base station, wherein the information comprises an indicator indicating that the radio link problem is detected.

17. An apparatus for communicating with a first base station and a second base station, the apparatus comprising:

at least one processor for detecting a radio link problem between the apparatus and the second base station;

a transmitter for stopping performing at least one uplink (UL) transmission for the second base station, after the radio link problem is detected; and a transmitter for transmitting information related to the radio link problem to the first base station, wherein the information comprises an indicator indicating that the radio link problem is detected.

18. An apparatus for communicating with a first base station and a second base station, the apparatus comprising a memory storing a first software module, a second software module, a third software module and at least one processor coupled to the memory, wherein:

when the at least one processor executes the first software module, the at least one processor detects a radio link problem between the at least one processor and the second base station;

when the at least one processor executes the second software module, the at least one processor stops performing at least one uplink (UL) transmission for the second base station, after the radio link problem is detected; and when the at least one processor executes the third software module, the at least one processor transmits information related to the radio link problem to the first base station, wherein the information comprises an indicator indicating that the radio link problem is detected.

* * * * *